United States Patent
Urban et al.

(10) Patent No.: US 8,131,444 B2
(45) Date of Patent: Mar. 6, 2012

(54) METHOD FOR RECOGNIZING A TURN MANEUVER AND DRIVER ASSISTANCE SYSTEM FOR MOTOR VEHICLES

(75) Inventors: Werner Urban, Vaihingen/Enz (DE); Holger Hofmann, Ravenstein/Ot Merchingen (DE); Brendan Gibson, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 671 days.

(21) Appl. No.: 11/989,020

(22) PCT Filed: Jun. 23, 2006

(86) PCT No.: PCT/EP2006/063481
§ 371 (c)(1),
(2), (4) Date: Mar. 5, 2009

(87) PCT Pub. No.: WO2007/014802
PCT Pub. Date: Feb. 8, 2007

(65) Prior Publication Data
US 2009/0204304 A1 Aug. 13, 2009

(30) Foreign Application Priority Data
Aug. 1, 2005 (DE) .......................... 10 2005 036 049

(51) Int. Cl.
*B60K 31/00* (2006.01)
*G05D 1/02* (2006.01)
*G06F 19/00* (2006.01)

(52) U.S. Cl. ............. 701/96; 701/301; 340/903; 342/70

(58) Field of Classification Search .................... 701/96, 701/207, 211, 41, 300, 301; 340/903, 435, 340/436; 342/70; 180/169
See application file for complete search history.

(56) References Cited

U.S. PATENT DOCUMENTS

| 5,761,629 | A  | * | 6/1998  | Gilling ........................... 701/96 |
| 5,999,874 | A  | * | 12/1999 | Winner et al. .................. 701/93 |
| 6,147,637 | A  | * | 11/2000 | Morikawa et al. .............. 342/70 |
| 6,427,111 | B1 | * | 7/2002  | Dieckmann ..................... 701/96 |
| 6,600,986 | B2 |   | 7/2003  | Steinle et al. |
| 6,805,216 | B2 | * | 10/2004 | Noecker ....................... 180/170 |
| 2003/0218564 | A1 | * | 11/2003 | Tamatsu et al. ................. 342/70 |
| 2004/0117090 | A1 | * | 6/2004  | Samukawa et al. ............. 701/45 |
| 2005/0102089 | A1 | * | 5/2005  | Linden ............................ 701/96 |
| 2007/0106475 | A1 | * | 5/2007  | Kondoh ........................ 701/301 |
| 2007/0142995 | A1 |   | 6/2007  | Wotlermann |

FOREIGN PATENT DOCUMENTS

| DE | 10047746 | 4/2002 |
| DE | 10358034 | 7/2005 |
| EP | 1195669  | 4/2002 |

OTHER PUBLICATIONS

International Search Report, PCT International Patent Application No. PCT/EP2006/063481 dated Sep. 29, 2006.

\* cited by examiner

*Primary Examiner* — Tan Q Nguyen
(74) *Attorney, Agent, or Firm* — Kenyon & Kenyon LLP

(57) ABSTRACT

A method for a driver assistance system of a motor vehicle includes the following steps: on the basis of a digital map of a navigation system, verifying whether there is a turn option, and, if there is a turn option, analyzing the dynamic data, measured by a locating system, of a preceding vehicle and calculating a turn probability for the preceding vehicle on the basis of these data.

16 Claims, 3 Drawing Sheets

METHOD FOR RECOGNIZING A TURN MANEUVER AND DRIVER ASSISTANCE SYSTEM FOR MOTOR VEHICLES

FIELD OF THE INVENTION

The present invention relates to a method for a driver assistance system for a motor vehicle.

BACKGROUND INFORMATION

A typical example of a driver assistance system is a so-called ACC system (adaptive cruise control). This is understood to be an adaptive cruise control system capable of regulating the speed of the vehicle at a desired speed selected by the driver and additionally having a locating system, e.g., a radar system, for locating preceding vehicles and thus, if necessary, capable of adapting the speed of the host vehicle to that of the preceding vehicle, the so-called target object. Such systems have previously been designed mainly for use on highways, but advanced ACC systems are being developed that are also suitable for use on rural roads and even in city traffic.

The target object for adaptive cruise control is usually a directly preceding vehicle in the same lane of the host vehicle. This system must therefore be capable of recognizing which lane a preceding vehicle is occupying. Therefore, a radar sensor having angle resolution is used, permitting measurement of not only the distance and relative speed of the preceding vehicle but also its azimuth angle and thus the transverse position with respect to the host vehicle.

To be able to perform a correct lane assignment, the anticipated course of the road and thus the anticipated path of the host vehicle is assessed. Frequently, the yaw rate of the host vehicle is measured for this path prediction, e.g., with the help of a yaw rate sensor, so that a curved course of the road may be recognized at least when the host vehicle has already entered the curve. In addition, the angular velocity of a group of preceding vehicles may also be used for the path prediction. If the host vehicle also has a navigation system, it is also possible to use the digital map of the navigation system to estimate the course of the road.

Path prediction then forms the basis for determining a so-called travel route envelope, which is understood to refer to a strip on the road that is somewhat wider than the host vehicle and follows the anticipated path of the vehicle. Only vehicles within this travel route envelope may then be considered as the target object for the adaptive cruise control.

There have already been proposals for varying the width or right and left boundaries of the travel route envelope depending on the situation. For example, when the host vehicle is in the outermost left lane of a multilane road, it is expedient to widen the travel route envelope to the left, so that the target object is not so easily lost in a curve to the left, whereas on the other hand, a narrower travel route envelope boundary is selected on the right side, thereby preventing so-called side lane interference due to vehicles in the right side lane. The situation is reversed accordingly when driving in the outermost right lane. To decide which lane of a multilane road the host vehicle is occupying, either the locating data of a group of preceding vehicles or the locating signals of stationary objects may be used.

On rural roads, the travel route envelope will be widened toward both sides, so that tracking of the target object is ensured even in tight curves. To recognize the type of road, whether highway or rural road, the digital map of the navigation system may be analyzed, if necessary.

In the normal case, an adaptation of the travel route envelope that conforms to the situation may be achieved in this way. However, the movement data on the preceding vehicles also enter into the determination of the travel route envelope and, if necessary, enter into the path prediction, so vehicles turning at highway exit ramps, intersections, or junctions may result in a misinterpretation of the situation and therefore a malfunction of the driver assistance system. This applies not only to ACC systems but also to safety systems (PSS, predictive safety system), for example, which warn the driver of the risk of collision or actively intervene in the guidance of the vehicle, if necessary, to prevent a collision or at least to minimize the consequences thereof.

SUMMARY

A greater robustness of the driver assistance system in the event of turn maneuvers by preceding vehicles may be achieved in accordance with an example embodiment of the present invention.

According to an example embodiment of the present invention, a check is performed on the basis of the information about the road system supplied by the digital map of a navigation system to ascertain whether there is a turn option in the prevailing situation and, if this is the case, the dynamic data on the preceding vehicles, at least the vehicle that forms the target object for the cruise control, are checked for whether they indicate an imminent turn by the vehicle in question. From these data, in particular the relative speed, the deceleration and the transverse movement of the preceding vehicle, a parameter indicating the turn probability of the vehicle is calculated. This turn probability may be taken into account in interpreting the traffic situation, thereby reducing the risk of misinterpretation and faulty responses.

If the movement data on preceding vehicles are used for predicting the path, for determining the lane of a multilane road in which the host vehicle is driving and/or for defining the boundaries of the travel route envelope, then the movement data of the vehicles for which there is a high probability of a turn may be eliminated or weighted at a lower level, so that the "anomalous" transverse movements of the turning vehicles do not result in an incorrect determination of the travel route envelope.

In the case of an ACC system, the travel route envelope may also be narrowed on the side to which the preceding vehicle will presumably turn. This has the advantage that the turning vehicle will leave the travel route envelope thereby narrowed at an earlier point in time and then will no longer be taken into account in the cruise control, so that then the next vehicle not turning is more rapidly selectable as a target object or, if there is no such vehicle, the host vehicle may accelerate back to the desired speed selected by the driver. This results in a quicker driving style that facilitates the flow of traffic on rural roads and in city traffic in particular.

Additionally or alternatively, the turn probability may also enter into the so-called object plausibility check. An object plausibility check is understood to refer to the processing step in which a probability that the located object will be within the travel route envelope is calculated in view of the unavoidable measurement inaccuracies of the locating system and on the basis of the predicted travel route envelope. When there is a high turn probability, this plausibility check parameter is reduced, so that the particular object is discarded as a target object for the cruise control at an earlier point in time.

In addition, the turn probability may also result in a modification of the dive-in strategy which is the strategy that determines to what extent the normal safety margin may be reduced temporarily in the event of deceleration of the preceding vehicle to avoid uncomfortably high decelerations or accelerations of the host vehicle and to "smooth out" the traffic flow.

Calculation of the turn probability is preferably based on one or more of the following criteria.

A speed criterion evaluates how much the speed of the target object deviates from the expected value. This is backed by the consideration that a vehicle preparing to turn will normally reduce its speed and therefore will drive more slowly than would customarily be expected in that particular situation. The expected speed may be determined based on various factors, e.g., taking into account the type of road (highway or rural road), the traffic status (e.g., inside or outside a built-up area), the history, i.e., the speed at which the particular vehicle was driving in the past and the course of the road. For example, an expected value for speed on a curved course of the road may be determined by assuming that the driver of the preceding vehicle will drive slowly enough so as not to exceed a conventional limit value for the transverse acceleration. The expected speed may be calculated from the known road curvature, which is ascertained on the basis of the yaw rate of the host vehicle and/or on the basis of the digital map in the navigation system.

An expected speed value is expediently calculated separately at first for each of the aforementioned factors and then the minimum of these speed values is formed. When the actual speed of the preceding vehicle, calculated based on the measured relative speed and the driving speed of the host vehicle, is significantly below this minimum and there is also the possibility of a turn, then an intent to turn may be deduced.

In the case of a deceleration criterion, the deceleration of the preceding vehicle is analyzed. A turn maneuver is typically preceded by persistent deceleration of the vehicle. A measure of the turn probability may therefore be obtained by measuring the duration of the period of time during which the deceleration of the vehicle is above a certain threshold value, based on the absolute value. Alternatively, the deceleration of the preceding vehicle may be integrated over time and then this integral may be obtained as a measure of the turn probability.

Another criterion is based on the measured transverse movement of the preceding vehicle. The transverse position of the preceding vehicle with respect to the longitudinal central axis of the host vehicle may be calculated on the basis of the distance and the azimuth angle measured by the radar sensor. The derivation over time then supplies the transverse velocity. The transverse position and transverse velocity may be related to the predicted course of the road. Depending on the distance from the intersection, junction or exit ramp, a significantly elevated transverse velocity may indicate that the preceding vehicle is initiating a turn maneuver or is changing lanes to a turn lane, if there is one. The information about the distance from the intersection or, if necessary, the start of the turn lane is obtainable from the navigation system data.

Each of the criteria described above thus yields a specific turn probability. In an expedient specific embodiment, a weighted mean of the specific turn probabilities is then formed as the final turn probability.

BRIEF DESCRIPTION OF THE DRAWINGS

An exemplary embodiment of the present invention is shown in the figures and explained in greater detail below.

DETAILED DESCRIPTION OF EXAMPLE EMBODIMENTS

Figure 1:
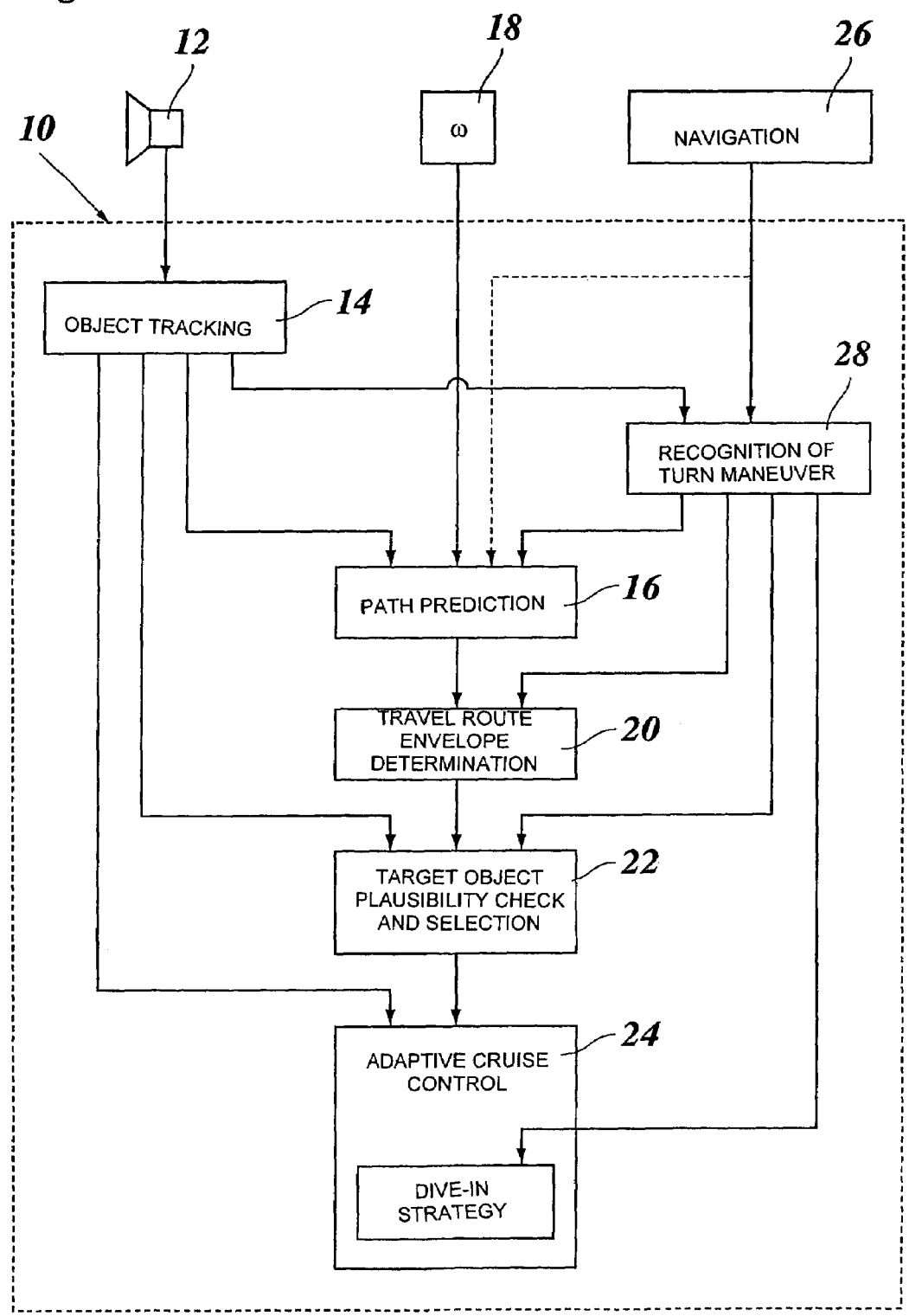
FIG. 1 shows a block diagram of a driver assistance system designed for implementing an example method according to the present invention.

As an example of a driver assistance system, FIG. 1 shows an ACC system 10, the basic design and functioning of which may be assumed to be conventional and therefore will be outlined only briefly here.

A radar sensor 12 having angle resolution installed in the front of the vehicle supplies ACC system 10 with locating data (distances, relative speeds, and azimuth angles) on the objects located. The measured data are updated cyclically, e.g., at intervals of approximately 1 ms. In a tracking module 14, the prevailing measured data are compared with the measured data from previous measurement cycles, thus making it possible to track the movements of individual objects.

A path prediction module 16 is used to estimate the anticipated path of the host vehicle. Therefore, in the simplest case, only yaw rate $\omega$ of the host vehicle is analyzed, this yaw rate being measured with the help of a yaw rate sensor 18, and a determination of road curvature in the road section on which the host vehicle is traveling at the moment being made possible in conjunction with the driving speed of the host vehicle.

In the example shown here, the data of tracking module 14 are also analyzed for the path prediction. Radar sensor 12 responds not only to preceding vehicles, but also to stationary objects and to oncoming traffic. However, the preceding vehicles are identifiable on the basis of the relationship between their relative speed and the driving speed of the host vehicle. If one or more preceding vehicles are located, then an imminent curve may be recognized by the fact that the preceding vehicles are executing a transverse movement as a group, although the host vehicle has not yet entered the curve and therefore yaw rate $\omega$ is practically zero.

On the basis of the predicted path, a travel route envelope, within which the vehicles that may be used as the target object for the adaptive cruise control must be situated, is determined in a travel route envelope module 20. In the simplest case, this travel route envelope is a strip having a certain standard width following the predicted path. However, on the basis of the data of tracking module 14, it is possible to recognize how many lanes are in the road on which the host vehicle is traveling and which of the lanes is occupied by the host vehicle. For example, to this end, a check may be performed to ascertain whether there are any preceding vehicles which have a transverse offset in relation to the host vehicle for a long period of time, this offset corresponding approximately to a conventional lane width. It is likewise possible to analyze how often the host vehicle has been passed or how often the host vehicle has passed other vehicles in the lane on the right side. Depending on the number of lanes detected in this way and depending on which lane the host vehicle is occupying, the travel route envelope may then be expanded or narrowed on one or both sides, if necessary.

A plausibility check is then performed on the objects located and tracked in tracking module 14 in a plausibility check module 22, i.e., a probability of an object being inside the travel route envelope is calculated for each object. This takes into account the fact that the locating data, in particular the transverse position data, have certain error tolerances that increase with an increase in object distance. If the probability that the object is within the travel route envelope is above a certain threshold, the object is "plausibilized," i.e., it is treated like a relevant object that is in one's own lane. Of the objects thereby plausibilized, ultimately the object having the smallest distance is then selected as the target object for the adaptive cruise control.

In a regulating module 24, the actual adaptive cruise control is then performed on the basis of the locating data on the target object by intervening in the drive system and, if necessary, also intervening in the brake system of the vehicle, so that the target object is tracked with a time gap that is selectable by the driver within certain limits. The regulating algorithm usually implements a dive-in strategy that allows the host vehicle not to be braked immediately or not to the same extent, e.g., in a braking maneuver of the target object, but instead to dive temporarily into the setpoint safety margin determined by the time gap.

ACC system 10 described here has an interface to a navigation system 26 of the vehicle. This navigation system contains a road map stored in digital form and ascertains the instantaneous position of the host vehicle with the help of a GPS system (global positioning system), so that information about the road type (highway or rural road) and about exit ramps, intersections, junctions, curves and the like yet to come is also available in the ACC system. As indicated by a dotted arrow in FIG. 1, the data of navigation system 26 may also be used for path prediction in path prediction module 16. It is nevertheless expedient to also use the locating data from the group of located vehicles for path prediction because the accuracy of the information provided by the navigation system regarding the curvature of the road and the position of the host vehicle is limited, and the precision and reliability of path prediction may be improved by fusing it with data from tracking module 14.

According to the present invention, ACC system 10 has a recognition module 28 for recognizing turn maneuvers. On the basis of the data of navigation system 26, a check is first performed in recognition module 28 to ascertain whether and at which distance there is a turn option. If the host vehicle is just before a highway exit ramp, a junction or intersection, recognition module 28 then analyzes the locating data supplied by tracking module 14 for the preceding vehicles to ascertain whether the movement pattern of one of these vehicles, in particular the target object being tracked, indicates an imminent turn maneuver. The analytical algorithm will be explained in greater detail below in conjunction with FIG. 3. The result of the analysis is a certain turn probability. In principle, such a turn probability is calculated for each vehicle located. For the sake of simplicity, however, it shall be assumed here that only the turn probability for the target object is calculated.

This turn probability may then be used in path prediction module 16 to modify the analysis of the transverse movements of the group of vehicles located. If the turn probability is above a certain threshold, the particular object is eliminated from the group in question, so the path prediction is not falsified by the turning vehicle. As an alternative, the weighting with which the target object enters into the transverse movement of the group may be reduced according to the turn probability. In this way, the accuracy of the path prediction is improved in the presence of turning vehicles.

By a similar method, the turn probability is also analyzed in travel route envelope module 20, namely for the determination of the number of lanes and for the determination of which lane the host vehicle is occupying. For example, if the target object pulls out into a turn lane, it is possible to prevent the false assumption in travel route envelope module 20 that there is an extra side lane. Since travel route envelope module 20 subjects the locating data on the objects to a statistical analysis and in doing so also still "remembers" events relatively long ago in the past, it is possible in particular to prevent the travel route envelope module from incorrectly assuming the existence of a side lane when the host vehicle has long passed the intersection and there is no longer a turn lane.

On the other hand, the turn probability in travel route envelope module 20 may also have an influence directly on the configuration of the travel route envelope, as will be explained in greater detail below in conjunction with FIG. 2.

Furthermore, the turn probability may also be taken into account in plausibility check module 22 in performing a plausibility check and selection of target object, with the result that the turning vehicle is not treated as a target object for an unnecessarily long period of time but instead switches rapidly to a new target object or to free travel (regulating at the desired speed).

Finally, the turn probability in the example shown also influences the dive-in strategy in regulating module 24. If it is known with sufficient certainty that the previous target object will be turning, then it is acceptable and appropriate to dive further into the safety margin.

It is self-evident that the recognition of turn maneuvers in recognition module 28 may be greatly improved if the vehicle is additionally equipped with a video system and is thus capable of recognizing the turn signal (blinker) of the preceding vehicle. In this case, however, analysis of the locating data supplied by tracking module 14 in recognition module 28 is also advisable because in this way a greater reliability and certainty in assessing the turn probability are achieved.

Figure 2:
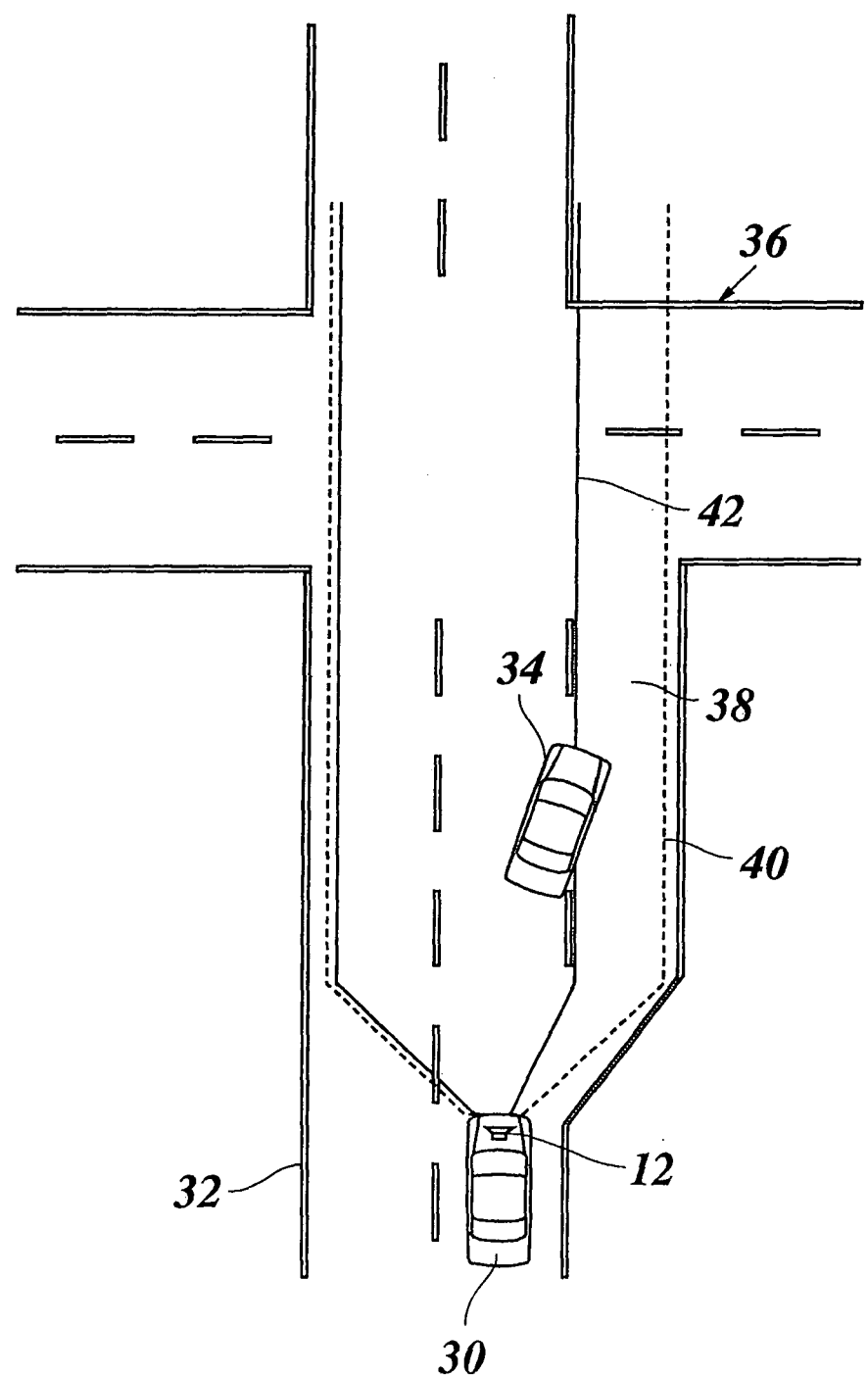
FIG. 2 shows a diagram of a traffic situation to illustrate the example method.

FIG. 2 illustrates a situation in which a vehicle 30 equipped with ACC system 10 according to FIG. 1 is traveling on a rural road or a city street 32 having only one lane per direction of travel and is tracking one preceding vehicle 34 as the target object. The two vehicles are just approaching an intersection 36 where there is a turn option. Vehicle 34 has reduced its speed and is about to pull out into a turn lane 38. Recognition module 28 is informed about the turn option on the basis of data in navigation system 26 and recognizes on the basis of the movement pattern of vehicle 34 that this vehicle will probably turn.

The dotted lines in FIG. 2 show a travel route envelope 40, which has been determined in travel route envelope module 20. Since the travel route envelope module has recognized that street 32 has only one lane per direction of travel, travel route envelope 40 is expanded symmetrically to the longitudinal axis of vehicle 30, so that target objects may be tracked reliably even on very winding stretches of road. However, a high turn probability is now recognized by recognition module 28 for vehicle 34, so travel route envelope module 20 develops into a travel route envelope 42 that is narrower on one side, namely on the right side, its right boundary being just outside of the lane occupied by host vehicle 30. This has the advantageous effect that vehicle 34 is no longer treated as a target object in plausibility check module 22 as soon as it has completed the switch to turn lane 38. Host vehicle 30 may therefore accelerate back to the desired speed without any unnecessary time lag and may optionally even pass vehicle 34 before it has finally turned.

Such a passing maneuver (without a prior lane change by host vehicle 30) would normally be interpreted by travel route envelope module 20 as if host vehicle 30 were now in the left lane of a two-lane road. This would result in the travel route envelope module retaining a narrowed travel route envelope 42 even when intersection 36 has long been passed. However, since recognition module 28 has recognized here that vehicle 34 is turning, travel route envelope module 20 "knows" that the presumed side lane is in fact a turn lane and it will therefore return to symmetrical travel route envelope 40 after passing intersection 36. The transverse movement of vehicle 34 detected by radar sensor 12 also does not result in an imminent right-hand curve in street 32 being incorrectly assumed in path prediction module 16 and then in the travel route envelope being curved accordingly.

Figure 3:
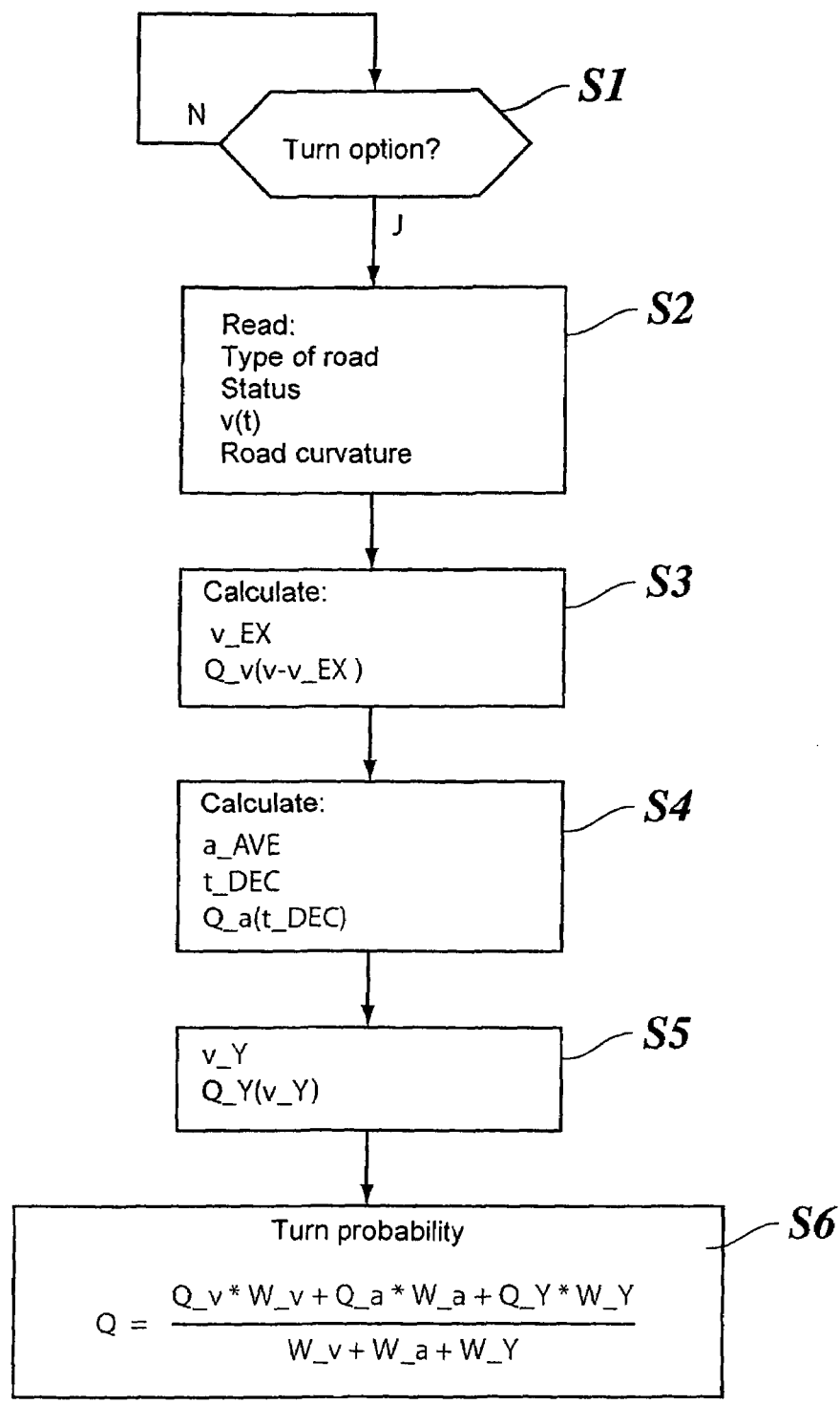
FIG. 3 shows a flow chart to illustrate steps of the method.

FIG. 3 illustrates as a flow chart a procedure which is periodically performed in recognition module 28 to recognize an imminent turn maneuver of the target object being tracked and to calculate a turn probability. In step S1, a check is performed on the basis of the data of navigation system 26 to ascertain whether there is a turn option in the road section immediately ahead. If this is not the case, step S1 is repeated periodically until a turn option is detected.

If there is a turn option, then in step S2 the following data are read: the type of road, which indicates, for example, whether the road on which the host vehicle is traveling is a highway or a two-lane rural road, the prevailing traffic status, e.g., inside or outside a built-up area, the history, i.e., absolute velocity v of the target object being tracked as a function of time and the curvature in the road at the location of the target object.

Information about the type of road is supplied by navigation system 26 and/or travel route envelope module 20. Information about the traffic status is supplied by navigation system 26. Absolute velocity v(t) of the target object in the recent past is obtained from the relative speed reported by tracking module 14 in conjunction with the driving speed of the host vehicle. The road curvature is determined based on data from navigation system 26 and/or (approximately) based on data from yaw rate sensor 18.

In step S3, a specific estimate of the speed (absolute velocity) that would be expected for the target object if it did not turn is then assigned to each quantity read in step S2. In Germany, this would mean a speed of 100 km/h, for example, for the type of road referred to as a "rural road," whereas for highways it would be the maximum allowed highway speed in that particular area (i.e., any speed in Germany). The maximum speeds in effect in each case may be looked up in a table of countries on the basis of position data supplied by the navigation system. Accordingly, an estimate of 50 km/h would be assigned to the "built-up area" traffic status in Germany. If navigation system 26 is an advanced system which also indicates maximum speeds in effect in the particular stretch of road on highways or rural roads, then the particular maximum speed is assigned to the "traffic status" quantity.

For example, an estimate corresponding to the average speed over time as driven by the target object in the last period of time is assigned to quantity v(t). The "road curvature" quantity takes into account the fact that the target object before and in curves will drive more slowly than on straight sections. It is assumed here that the speed is reduced to the extent that the transverse acceleration occurring because of the road curvature will not exceed a conventional limit. If necessary, the "history" of the speed data may also be accessed, so that the limiting value for the transverse acceleration may be adapted to the previous behavior of the driver of the preceding vehicle. The estimate for the speed is then calculated from the assumed limiting value for the transverse acceleration and the prevailing road curvature, so that the transverse acceleration just corresponds to the limiting value. The minimum of the four estimates for the speed obtained in this way then forms expected speed v_EX. A specific turn probability Q_v is then calculated from the difference from expected speed v_EX and prevailing speed v of the target object according to a fixedly defined function (function specification or table). The turn probability is higher as the actual speed drops further below v_EX.

In step S4, another specific turn probability Q_a is calculated on the basis of the deceleration behavior of the target object. To do so, an average a_AVE for the deceleration (negative acceleration) of the target object is calculated first from the measured absolute speeds of the target object with a suitable time constant. If the absolute value of this average deceleration exceeds a certain threshold value, then a timer is started and a time t_DEC, during which average acceleration a_AVE remains above the threshold value, is then measured continuously in the successive run-through cycles of the routine shown in FIG. 3. Specific turn probability Q_a is then a monotonically increasing function of t_DEC, i.e., the turn probability is higher as the deceleration of the target object persists for a longer period of time.

Another specific turn probability Q_Y is calculated in step S5 on the basis of transverse movements of the target object. To do so, transverse velocity v_Y of the target object is measured first and turn probability Q_Y is then a monotonically increasing function of this transverse velocity, i.e., the turn probability is greater, the faster the target object is moving transversely. According to one refinement, it is possible to take into account here how far the target object is at a distance from the turn option or, if the data of the navigation system indicates the presence of a turn lane or a slow lane, how far it is from the start of this slow lane.

Finally in step S6, a final turn probability Q is calculated from specific turn probabilities Q_v, Q_a and Q_Y, which were calculated in steps S3 through S5, by forming a weighted mean of the specific turn probabilities with weighting factors W_v, W_a and W_Y.

What is claimed is:

1. A method for a driver assistance system of a host motor vehicle, comprising:
   checking on whether there is a turn option for a vehicle preceding the host motor vehicle based on a digital map of a navigation system; and
   responsive to a determination that the turn option is available, analyzing dynamic data of the vehicle preceding the host motor vehicle, measured by a locating system, and calculating a turn probability for the vehicle preceding the host motor vehicle based on the dynamic data.

2. The method as recited in claim 1, wherein the turn probability is a combination of several specific turn probabilities, each being determined based on different criteria.

3. The method as recited in claim 2, wherein one of the specific turn probabilities is a function of a difference between an actual speed of the vehicle preceding the host motor vehicle and an expected speed of the preceding vehicle which would be expected for a vehicle not turning.

4. The method as recited in claim 3, wherein the expected speed is a minimum of two or more estimates, each being determined based on one of the following parameters: type of road, traffic status, previous speed of the vehicle preceding the host motor vehicle, or road curvature.

5. The method as recited in claim 2, wherein one of the specific turn probabilities is calculated based on a measured deceleration of the vehicle preceding the host motor vehicle.

6. The method as recited in claim 2, wherein one of the specific turn probabilities is calculated based on a measured transverse movement of the vehicle preceding the host motor vehicle.

7. The method of claim 1, wherein the dynamic data includes an identifier of a road type on which the host motor vehicle is traveling and that is supplied by the navigation system, the road type affecting the calculating of the turn probability.

8. The method of claim 1, wherein the dynamic data includes an identifier of a prevailing traffic status supplied by the navigation system, the prevailing traffic status affecting the calculating of the turn probability.

9. A driver assistance system for a host motor vehicle, comprising:
an arrangement adapted to check on whether there is a turn option for a vehicle preceding the host motor vehicle based on a digital map of a navigation system, and responsive to a determination that the turn option is available, analyzes dynamic data of the vehicle preceding the host motor vehicle, measured by a locating system, and calculates a turn probability for the vehicle preceding the host motor vehicle based on the dynamic data.

10. The driver assistance system as recited in claim 9, further comprising:
a prediction module adapted to calculate an anticipated path of the host motor vehicle, taking into account locating data of one or more preceding vehicles, the prediction module being designed to disregard or weight lower, for the purpose of path prediction, locating data of preceding vehicles for which there is a high turn probability.

11. The driver assistance system as recited in claim 10, further comprising:
a travel route envelope module adapted to recognize at least one of how many lanes a directional lane currently being traveled has and which lane the host motor vehicle is traveling in, taking into account the locating data of one or more preceding vehicles, and to determine a configuration of a travel route envelope as a function thereof, and to disregard or weight lower those preceding vehicles for which there exists a high turn probability when determining the at least one of the number of lanes and the lane in which the host motor vehicle is traveling.

12. The driver assistance system as recited in claim 11, further comprising:
an adaptive cruise control module adapted to regulate a distance from a preceding vehicle which is being tracked as a target object, the tracked vehicle being within the travel route envelope determined by the travel route envelope module, wherein the travel route envelope module is adapted to vary the configuration of the travel route envelope as a function of the turn probability of the target object.

13. The driver assistance system as recited in claim 11, further comprising:
an adaptive cruise control module adapted to regulate a distance from a preceding vehicle which is being tracked as a target object; and
a plausibility check module adapted to determine a plausibility check parameter that indicates a probability that a preceding vehicle which is being tracked as a target object will be within a travel route envelope determined by the travel route envelope module, wherein the plausibility check module is adapted to vary the plausibility check parameter as a function of the turn probability of the target object.

14. The driver assistance system as recited in claim 11, further comprising:
an adaptive cruise control module adapted to regulate a distance from a preceding vehicle which is being tracked as the target object;
wherein the adaptive cruise control module is adapted to determine a dive-in strategy, and is adapted to determine how much the distance from the target object may temporarily fall below a predetermined safety margin in an event of deceleration of the target object, the adaptive cruise control adapted to vary the dive-in strategy as a function of the turn probability of the target object.

15. The driver assistance system of claim 9, wherein the dynamic data includes an identifier of a road type on which the host motor vehicle is traveling and that is supplied by the navigation system, the road type affecting the calculating of the turn probability.

16. The driver assistance system of claim 9, wherein the dynamic data includes an identifier of a prevailing traffic status supplied by the navigation system, the prevailing traffic status affecting the calculating of the turn probability.

* * * * *